Dec. 4, 1951  F. W. SHRADER ET AL  2,577,691
WEIGHT MEASURING APPARATUS
Filed Jan. 18, 1945

Inventor
FRED W. SHRADER
HENRY W. BIGGE
By
Attorney

Patented Dec. 4, 1951

2,577,691

UNITED STATES PATENT OFFICE 2,577,691

WEIGHT MEASURING APPARATUS

Fred W. Shrader, Los Angeles, and
Henry W. Bigge, Oakland, Calif.

Application January 18, 1945, Serial No. 573,421

9 Claims. (Cl. 265—40)

This invention relates to apparatus for weighing the useful loads of a load transporting or carrying device. The invention has particular utility in the weighing of freight loadings of motor trucks or truck and trailer combinations, although it may be applied to the weighing of the useful loads of other load carrying devices.

The development of motor freight transport has been characterized by a gradual increase in the amount of tonnage carried by motor trucks. Because of the damaging effect upon hard surfaced pavements from the passing of heavily laden trucks thereover, laws have been passed which require the distribution of weight so that the loading on a single wheel does not exceed a given maximum. To obtain higher loading for a single vehicle or train of vehicles, recourse has been had to the multiplicity of wheels, but with the increasing demands for taking advantage of the maximum permissible loading on each wheel, there has arisen an increased need for effecting an even distribution of weight over all of the wheels. This need for even distribution has arisen not only from a desire to attain maximum permissible loadings, but from the fact that the life of the vehicle itself—and particularly of the tires thereof—is deleteriously affected by unequal loading.

Having in mind the above described problems, the invention has as one object to provide a weighing mechanism by means of which the useful load carried by a load carrying member, may be indicated at a remote point.

Another object is to provide a weighing mechanism by means of which the loading on each of a plurality of wheels of a motor truck or trailer can be quickly and easily measured.

A further object of the invention is to provide a weighing mechanism, by means of which the individual loadings of the wheels of a motor truck or trailer can be instantaneously read at the dash board of the truck or trailer locomotive, by the operator thereof.

Another object of the invention is to provide a weighing mechanism of the type indicated above, which can be made inoperative or operative at the will of the operator. More specifically, in this connection, the invention contemplates an arrangement wherein the weighing mechanism can be disconnected for normal operation of the vehicle and can be instantly connected at any time, as, for example, when the vehicle is being loaded.

A further object of the invention is to provide mechanism for weighing, at the dash of a locomotive and trailer combination, the loading on each wheel thereof, which mechanism includes connections from weighing mechanism at the loading point to indicating mechanism at the dash which connections are of a quick-disconnect type, permitting the locomotive to be readily detached from the trailer.

Another object of the invention is to provide a weighing apparatus which is relatively simple in construction and arrangement, is dependable in service, will not easily get out of order, and yet furnishes the desirable characteristics outlined above.

The invention attains the foregoing objects by utilizing the deflection of a load carrying member, such as a truck axle, to operate a sensitive pressure responsive instrument of a type capable of transmitting its response to a recording or indicating instrument which may be remotely positioned. For example, the invention may utilize, in an electric circuit including a remotely positioned indicating instrument, a pressure responsive device in the form of a variable resistance, the value of which changes in accordance with pressure exerted thereagainst by a linkage adapted to abstract movement from changes in deflection in a truck axle in response to changes in loading thereof. The indicating instrument may be a current intensity measuring device adapted to respond to changes in the current flowing in the circuit in response to changes in the resistance of the pressure sensitive instrument. The system may be disconnected by mechanically removing the pressure sensitive instrument from its pressure receiving connection with the axle. In its alternative aspects, the invention may utilize hydraulic pressure sensitive and measuring instruments or may utilize simply mechanical pressure measuring devices which may be mounted directly upon the axles or load carrying members, the deflection of which is to be measured.

Further objects and advantages of the invention will be brought out in the following part of the specification.

Referring to the drawings which are for illustrative purposes only,

Figure 1:
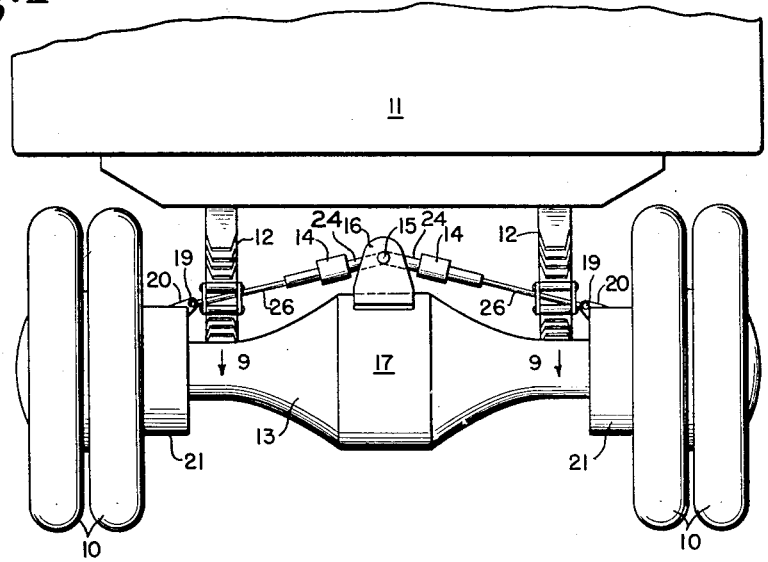
Fig. 1 is a rear elevation of a motor truck embodying the invention.
Figure 3:
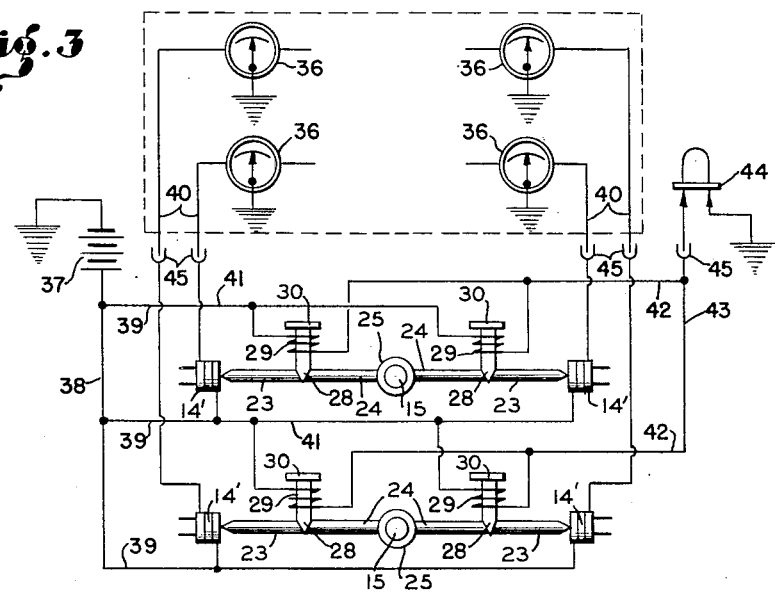
Fig. 3 is a wiring diagram of the mechanism shown in Fig. 1.
Figure 2:
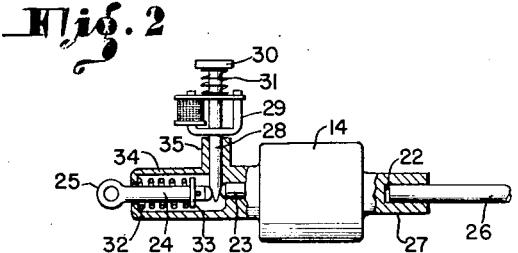
Fig. 2 is a detail, partially in section, of one of the load measuring instruments.

The weight measuring apparatus shown in Figs. 1, 2, and 3 is adapted to measure the loading upon each of the wheels 10, of a motor truck in which the weight of the useful load, carried in the body 11 of the truck, is transmitted through the springs 12 to the axle housing 13, by measuring the downward deflection of the housing 13, as indicated by the arrows 9, under the load.

Deflection is measured by a strain responsive instrument 14 interposed between two bearing points which are fixedly associated with the axle housing 13, are spaced longitudinally thereof, and are spaced vertically from the axis therof so that their longitudinal spacing will vary in accordance with the variations in axle deflection. For example, one of the bearing points may be a trunnion 15 mounted in the upper end of a bracket 16 carried by the differential housing 17 of the axle assembly, and the other bearing point may be a trunnion 19 mounted in a bracket 20 carried by a brake drum 21 of the axle housing. With the bearing points thus disposed above the axis of the housing, the bearing points 15 and 19 will move toward each other with increased deflection of the axle housing, and such movement may be utilized to develop pressure against the instrument 14 which, under such conditions, will be a pressure responsive device. Pressure is applied to the instrument 14 by linkage comprising a series of pressure transmitting elements interposed, together with the instrument 14, in series between the bearing points 15 and 19. These elements may include (Fig. 2) the movable stem 23 of the instrument 14; a rod section 24 having an eye 25 pivoted on the trunnion 15; a relatively long rod section 26 pivoted on the trunnion 19, slidably extended into a sleeve 27 forming an extension of the casing of the instrument 14, and adapted to engage at its end a solid abutment 22 at the bottom of the bore in the sleeve 27; and a connecting element 28 which is retractible for the purpose of relieving the pressure on the series of pressure transmitting elements.

The retractible pressure transmitting element 28 may be in the form of a bolt having a wedged shaped end received between rounded ends of the stem 23 and the rod section 24. These rounded ends, and the wedged shaped end of the bolt 28 are accurately ground to a precision finish. The abutment surface 22 and the end of the rod 26 will likewise be precision finished.

The invention contemplates the use of remote control means for retracting and advancing the bolts 28. For the most satisfactory attainment of detachability of the indicating instrument (in the locomotive cab, for example) from the pressure sensitive mechanism (carried by the trailer axles, in the example given) we prefer to employ electromagnetic means for advancing the bolt 28. Such means may comprise an electromagnet 29 adapted, when energized, to attract an armature 30 carried by the bolt 28 and to thereby move the bolt 28 inwardly, causing the wedge shaped end thereof to spread apart the stem 23 and rod section 24. This will result in shifting the instrument 14 toward the rod 26 so as to establish full abutting engagement between the end of the rod and the abutment surface 22. The strength of the magnet 29 is sufficient, and the wedging angle of the end portion of the bolt 28 is such as to balance the maximum amount of pressure which will be applied to the instrument 14 by maximum loading of the vehicle.

Upon the deenergization of the magnet 29, the spring 31 is suitably arranged to effect such retracting movement, as by being interposed between the magnet 29 and the armature 30. Retraction of the bolt 28 results in the introduction of sufficient end play in the series of pressure trransmitting elements to completely remove the pressure from the instrument 14. One method of doing this is to bodily move the instrument 14 away from the rod 26 so as to introduce the end play between the rod 26 and the abutment surface 22, such bodily movement being accomplished by a spring 32 interposed between a shoulder 33 on the rod section 24 and the end of a bearing collar 34 in which the rod section 24 is slidably mounted. The bearing collar 34 may be formed as an extension of the casing of the instrument 14 and may be provided with a suitably laterally extending bearing boss 35 for slidably mounting the bolt 28 and carrying the magnet 29.

By introducing end play in the series of pressure transmitting linkage, as described above, the truck may be operated without producing any response in the weight measuring apparatus of our invention. This saves the apparatus and spares the operator the annoyance of having in front of him a series of constantly fluctuating indicator dials during operation of the vehicle.

Referring now to Fig. 3, the response of the individual pressure sensitive instruments 14 is transmitted to a series of indicating instruments 36, suitably mounted in the operators' cab, where they may be read by the operator without dismounting from the cabin. The instruments 36 may be current intensity measuring instruments, such as, for example, milliammeters or microammeters, in which case they will respond to variations in tthe intensity of electric currents transmitted from a battery 37 through a conductor 38 and branch conductors 39 to the pressure-sensitive instruments 14 (which may be of a type of instrument adapted to vary in electrical resistance with a variation in pressure—for example, a carbon pile pressure gauge 14') and from the instrument 14 through a series of conductors 40 to the indicator instruments 36, each of which is grounded to provide its individual circuit.

The electromagnets 29 are energized through conductors 41 leading from the battery 37, and conductors 42 connected, through a common conductor 43, to a push button switch 44, which, when pushed, establishes a common ground for the electromagnets and completes the circuits through all of the electromagnets simultaneously.

All of the wires 40 and 43 may be carried to the cab in a single conduit. In order to provide for quick separation of the cab from the trailer of a combination vehicle, we provide separable connectors 45 in each of the lines 43 and 40. The connectors 45 may be of the plug and socket type, and may be embodied in a single multiple contact plug and socket connector.

The invention provides an arrangement wherein the pressure sensitive instrument, reacting to changes in deflection in an elongated member which is directly subjected to the variable useful loads, is so correlated with the indicator instruments that the latter will show a zero reading under the deflection produced by the weight of the structural members of the vehicle itself, and will indicate directly in pounds the amount of useful load carried by each wheel of the vehicle. In those forms of the invention utilizing electrical instruments, the proper correlation may be obtained by special calibration of the indicating instruments and by adjustment of the resistance of the circuit against the resistance of the pressure sensitive instruments. The correlation of the parts also includes the selection of length of the rods 24, 26 and the other elements interposed between the bearing points 15 and 19, so that when the bolt 28 is advanced, in the unloaded condition of the vehicle, the indicator instruments will read zero.

We claim as our invention:

1. Apparatus for measuring the load carried by a load carrying mechanism including a load carrying member which acts as a rigid member in performing its normal useful load carrying function but which is subject to small deflections which vary with changes in the useful load carried by said mechanism, comprising, in combination with said load carrying member, means rigidly attached thereto and providing a pair of bearing points which are spaced laterally from the longitudinal axis of said load carrying member and are spaced from each other longitudinally of said axis, a load sensitive instrument and load transmitting means interposed in series therewith between said bearing points, adapted to transform changes in deflection of said load carrying member into changes in loading on said load sensitive instrument, means forming a part of said load transmitting means operative to render said load transmitting means effective or ineffective, whereby said load sensitive instrument may be relieved of load, and an indicating instrument operatively connected to said load sensitive instrument and adapted to react to the changes in loading of said load sensitive instrument so as to give a direct reading of the useful load carried by said load bearing member.

2. Apparatus for measuring the useful load of a load carrying mechanism including an elongated load carrying member which acts as a substantially rigid member in performing its normal useful load carrying function but which is subject to small downward deflections which vary with changes in the useful load, said apparatus comprising, in combination with said load carrying member, means rigidly associated therewith and projecting upwardly to provide a pair of bearing points spaced above the longitudinal axis of said member and spaced longitudinally from each other, means interposed between said bearing points and adapted to take, in compression, the movement toward each other of said bearing points produced by said downward deflections, said means including a compression responsive instrument, one of the constituent parts of said last named means being movable into a position rendering said last named means incapable of transmitting compression to said compression responsive instrument, and an indicator instrument connected to said compression responsive instrument and adapted to respond to changes in compression in said compression responsive instrument and, in thus responding, to give a direct reading of the useful load on said load bearing member.

3. Apparatus for measuring the useful load carried by a load carrying apparatus including a load carrying member which acts as a substantially rigid member in performing its normal useful load carrying function but which is subject to small deflections which vary with changes in load, said apparatus comprising, in combination with said load carrying member, means including a load responsive variable resistance connectible to said load carrying member in a manner to transform changes in deflection in said load carrying member into changes in electrical resistance, an electric current measuring instrument in a circuit with said variable resistance and adapted to respond to variations in said resistance, so as to give a direct reading of the load carried by said member, means for supplying electric current to said circuit, and means operating in response to the supply of electric current to said circuit for connecting said load responsive variable resistance to said load carrying member.

4. Apparatus for measuring the useful load carried by a wheeled vehicle having a pair of wheels supporting an axle, and having a carrying body supported on said axle at points intermediate said wheels and the central region of said axle, said apparatus comprising, in combination with said axle, means rigidly associated with said axle providing a pair of bearing points vertically spaced from the axis of said axle and spaced from each other longitudinally of said axle, means including a load sensitive instrument interposed between said bearing points and responsive to the change in distance between said bearing points as the result of deflection of said axle under the useful load carried by said vehicle, an indicator instrument operatively connected with said load sensitive instrument, adapted to respond to the changes in loading thereon caused by said axle deflection, and to give a direct reading of the loading on said load carrying member, means selectively operable for rendering said indicator instrument operable or inoperable, and mechanism controlled by said last named means for removing load from said load sensitive instrument when said indicator instrument is inoperable.

5. Apparatus for measuring the useful load on a load supporting device including a load bearing member which is subject to deflections which vary with changes in the useful load supported by said device, strain gauge mechanism, linkage means to connect said strain gauge mechanism to spaced points of said load bearing member, said linkage means including a plurality of linkage parts forming a train of parts for transmitting movement from said spaced points of said load bearing member to said strain gauge mechanism, at least one of said parts being movably related to the remainder of said parts so as to alternately establish and interrupt said train, means operating to guide said movably related part in its movement into the position in which it will establish said train, means for applying force to said removably related part to move it between positions wherein it will interrupt or establish said train, and indicating mechanism controlled by said strain gauge mechanism, said indicating mechanism being arranged to indicate the load carried by said load bearing member.

6. Apparatus for measuring the useful load on a load supporting device including a load bearing member which is subject to deflections which vary with changes in the useful load supported by said device, strain gauge mechanism, linkage means to connect said strain gauge mechanism to spaced points of said load bearing member, said linkage means including a plurality of linkage parts forming a train of parts for transmitting movement from said spaced points of said load bearing member to said strain gauge mechanism, at least one of said parts being movably related to the remainder of said parts so as to alternately establish and interrupt said train, means operating to guide said movably related part in its movement into the position in which it will establish said train, means operative from a control station for applying force to said removably related part to move it between positions wherein it will interrupt or establish said train, and indicating mechanism located in said control station and controlled by said strain gauge mechanism, said indicating mechanism being arranged to indicate the load carried by said load bearing member.

7. Apparatus for measuring the useful load on a load supporting device including a load bearing member which is subject to deflections which vary with changes in the useful load supported by said device, electrical strain gauge mechanism, linkage means to connect said strain gauge mechanism to spaced points of said load bearing member, said linkage means including a plurality of linkage parts forming a train of parts for transmitting movement from said spaced points of said load bearing member to said strain gauge mechanism, at least one of said parts being movably related to the remainder of said parts so as to alternately establish and interrupt said train, means operating to guide said movably related part in its movement into the position in which it will establish said train, electrical means for applying force to said removably related part to move it between positions wherein it will interrupt or establish said train, and electrical indicating mechanism controlled by said strain gauge mechanism, said indicating mechanism being arranged to indicate the load carried by said load bearing member.

8. In apparatus for measuring the useful load on a load transporting device including a load bearing member which acts as a rigid member in performing its normal useful load bearing function but which is subject to small deflections which vary with changes in the useful load transported by the device, a strain gauge mechanism adapted to measure changes in deflection of said load bearing member, said mechanism including movement measuring means adapted to measure movement of spaced parts of said load bearing member, connector parts arranged to make connection of said mechanism with spaced parts of said load bearing member, a control member movable between a position in which it will inhibit operation of said movement measuring means by movement of said spaced parts of said load bearing member and the second position in which it will enable operation of said movement measuring means by movement of said spaced parts of said load bearing member, means to support said control member and guide the same in its movement into said second position, and actuating means operative to move said control member between said first and second positions thereof, said control member being so related to said measuring means that its movement by said actuating means into said second position will effect application of movement to said measuring means so that said measuring means will indicate the deflection of said load bearing member.

9. In apparatus for measuring the useful load on a load transporting device including a load bearing member which acts as a rigid member in performing its normal useful load bearing function but which is subject to small deflections which vary with changes in the useful load transported by the device, a strain gauge mechanism adapted to measure changes in deflection of said load bearing member, said mechanism including movement measuring means adapted to measure movement of spaced parts of said load bearing member, connector parts arranged to make connection of said mechanism with spaced parts of said load bearing member, a control member movable between a position in which it will inhibit operation of said movement measuring means by movement of said spaced parts of said load bearing member and the second position in which it will enable operation of said movement measuring means by movement of said spaced parts of said load bearing member, and actuating means operative to move said control member between said first and second positions thereof, said control member being so related to said measuring means that its movement by said actuating means into said second position will effect application of movement to said measuring means so that said measuring means will indicate the deflection of said load bearing member.

FRED W. SHRADER.
HENRY W. BIGGE.

REFERENCES CITED

The following references are of record in the file of this patent:

UNITED STATES PATENTS

| Number | Name | Date |
| --- | --- | --- |
| 1,147,127 | Troll | July 20, 1915 |
| 1,407,078 | Murray | Feb. 21, 1922 |
| 1,621,093 | Troll | Mar. 15, 1927 |
| 1,708,333 | Smith | Apr. 9, 1929 |
| 2,041,987 | Wickstrom | May 26, 1936 |
| 2,109,460 | Brasher | Mar. 1, 1938 |
| 2,213,982 | Frey et al. | Sept. 10, 1940 |
| 2,322,319 | Ruge | June 22, 1943 |